US007372253B2

(12) United States Patent
Biber et al.

(10) Patent No.: US 7,372,253 B2
(45) Date of Patent: May 13, 2008

(54) MAGNETIC FIELD SENSOR FOR MEASURING THE ROTATIONAL SPEED OF A TURBOSHAFT

(75) Inventors: Peter Biber, Regensburg (DE); Markus Gilch, Mauern (DE); Jean-Louis Roux, Brax (FR); Antoine Simonnet, Toulouse (FR)

(73) Assignees: Siemens Aktiengesellschaft, München (DE); Siemens VDO Automotive, Toulouse (FR)

( * ) Notice: Subject to any disclaimer, the term of this patent is extended or adjusted under 35 U.S.C. 154(b) by 0 days.

(21) Appl. No.: 11/474,813

(22) Filed: Jun. 26, 2006

(65) Prior Publication Data

US 2007/0075703 A1    Apr. 5, 2007

(30) Foreign Application Priority Data

Jun. 27, 2005    (DE)    ...................... 10 2005 029 764

(51) Int. Cl.
*G01B 7/30*    (2006.01)
(52) U.S. Cl. .............. 324/174; 324/207.25; 324/207.2; 324/207.21
(58) Field of Classification Search ........ 324/173–174, 324/207.12–207.25
See application file for complete search history.

(56) References Cited

U.S. PATENT DOCUMENTS

| 4,185,265 | A | * | 1/1980 | Griffin et al. | ............... 340/905 |
| 4,279,576 | A | * | 7/1981 | Okano et al. | ............... 417/407 |
| 4,439,728 | A | * | 3/1984 | Rickman, Jr. | ............... 324/164 |
| 4,924,674 | A | * | 5/1990 | Hara et al. | ................... 60/608 |
| 2005/0017709 | A1 | | 1/2005 | Stolfus et al. | |

FOREIGN PATENT DOCUMENTS

| DE | 1 763 008 A | | 6/1971 |
| DE | 33 37 606 A1 | | 5/1985 |
| DE | 38 01 171 C1 | | 5/1989 |
| WO | WO 2006/045680 | * | 5/2006 |

* cited by examiner

*Primary Examiner*—Jay M Patidar
(74) *Attorney, Agent, or Firm*—Cohen Pontani Lieberman & Pavane LLP

(57) ABSTRACT

A sensor for measuring the rotational speed of a turboshaft of a turbocharger includes a sensor housing and a sensor element which is positioned in the sensor housing and which senses a variation of a magnetic field caused by the rotation of the turboshaft. In order to provide a sensor for measuring the rotational speed of a turboshaft which can be produced simply and at low cost and also can be integrated in a turbocharger without major structural modifications, the sensor element can be positioned outside the turbocharger, on or in a compressor housing, and a pole piece is arranged on the sensor element in such a way that it concentrates the magnetic field in the sensor element.

17 Claims, 7 Drawing Sheets

MAGNETIC FIELD SENSOR FOR MEASURING THE ROTATIONAL SPEED OF A TURBOSHAFT

BACKGROUND OF THE INVENTION

The present invention relates to a sensor for measuring the rotational speed of a turboshaft of a turbocharger with a sensor housing and a sensor element positioned in the sensor housing and which senses a variation of a magnetic field caused by the rotation of the turboshaft.

The power generated by an internal combustion engine depends on the air mass and the corresponding amount of fuel that can be made available to the engine for combustion. If an increase in the power of the internal combustion engine is desired, an increased amount of combustion air and fuel must be supplied to the engine. In a naturally aspirated engine, this increase in power is achieved by an increase in the swept volume or by increasing the rotational speed. However, an increase in the swept volume leads in principle to engines that are heavier, have larger dimensions, and are consequently more expensive. Increasing the rotational speed entails considerable problems, in particular in the case of larger engines, and is limited for technical reasons.

A much used technical solution for increasing the power of an internal combustion engine is that of supercharging. This is the term used for boosting the combustion air by an exhaust gas turbocharger or else by means of a compressor that is mechanically driven by the engine. An exhaust gas turbocharger substantially comprises a flow compressor and a turbine, which are connected to a common shaft and rotate at the same speed. The turbine converts the normally wasted energy of the exhaust gas into rotational energy and drives the compressor. The compressor sucks in fresh air, compresses it and transports the compressed air to the individual cylinders of the engine. The greater amount of air in the cylinders can be supplied with an increased amount of fuel, whereby the internal combustion engine delivers more power. The combustion process is also favorably influenced, so that the engine achieves a better overall efficiency. In addition, the torque characteristic of an internal combustion engine supercharged by a turbocharger can be formed extremely favorably. By using an exhaust gas turbocharger, normally aspirated production engines that vehicle manufacturers have in stock can be significantly optimized without major modifications of the structural design of the engine. Supercharged internal combustion engines generally have a lower specific fuel consumption and have lower pollutant emission. In addition, turbo-engines are generally quieter than naturally aspirated engines of the same power, since the exhaust gas turbocharger itself acts like an additional muffler. In the case of internal combustion engines with a great operating speed range, for example in the case of engines for passenger cars, a high boost pressure is required even at low engine speeds. In the case of these turbochargers, a boost-pressure control valve, known as a waste-gate valve, is introduced. By choosing an appropriate turbine housing, a high boost pressure is quickly built up even at low engine speeds. Once the appropriate high boost pressure is reached, the boost-pressure control valve (waste-gate valve) then limits the boost pressure to a constant value as the engine speed increases. As an alternative to this, turbochargers with variable turbine geometry (VTG) are used. In the case of these turbochargers, the boost pressure is regulated by changing the turbine geometry.

With an increasing amount of exhaust gas, the maximum permissible rotational speed of the combination comprising the turbine wheel, the compressor wheel and the turboshaft, also referred to as the running gear of the turbocharger, may be exceeded. Inadmissible exceeding of the rotational speed of the running gear would cause it to be destroyed, which would be equivalent to total loss of the turbocharger. Modern turbochargers are built with much smaller turbine wheel and compressor wheel diameters and have improved rotational acceleration behavior as a result of a considerably smaller mass moment of inertia. However, these types of turbochargers are particularly susceptible to damage caused by exceeding the permissible maximum speed. Depending on the design of the turbocharger, even exceeding the speed limit by approximately 5% leads to complete destruction of the turbocharger.

The boost-pressure control valves, which according to the prior art are controlled by a signal resulting from the generated boost pressure, have been successfully used for speed limitation. If the boost pressure exceeds a predetermined threshold value, the boost-pressure control valve opens and conducts part of the mass flow of exhaust gas past the turbine. As a result of the reduced mass flow, said turbine takes up less power, and the compressor power is reduced to the same degree. The boost pressure and the rotational speed of the turbine wheel and of the compressor wheel are reduced. However, this control is relatively sluggish, since the pressure buildup when the rotational speed of the running gear is exceeded takes place with a time delay. Therefore, the speed control for the turbocharger with the boost pressure monitoring must intervene in the highly dynamic range (power-off) by appropriately early reduction of the boost pressure, which leads to a loss of efficiency.

Direct measurement of the rotational speed at the compressor wheel or at the turbine wheel proves to be difficult, since for example the turbine wheel is exposed to extreme thermal loading (up to 1000° C.), which prevents speed measurement by conventional methods at the turbine wheel. In a publication by acam-Mess-elektronic GmbH of April, 2001, it is proposed to measure the compressor blade pulses on the eddy current principle and determine the speed of the compressor wheel in this way. This method is complex and expensive, since at least one eddy current sensor would have to be integrated in the housing of the compressor in the direct vicinity of the compressor blades, which is likely to be extremely difficult because of the high precision with which components of a turbocharger are produced. Apart from the precise integration of the eddy current sensor in the compressor housing, sealing problems arise, problems which, on account of the high thermal loading of a turbocharger, can only be overcome by sophisticated modifications of the structural design of the turbocharger.

SUMMARY OF THE INVENTION

An object of the present invention is therefore to provide a sensor for measuring the rotational speed of a turbocharger which can be produced simply and at low cost and also can be integrated in a turbocharger without major structural modifications.

The object of the present invention is met by a sensor having a sensor element positioned outside the turbocharger, on or in a compressor housing, and a pole piece arranged on the sensor element such that the pole piece concentrates the magnetic field in the sensor element.

This positioning of the sensor element allows commercially available electronic sensor elements such as Hall sensors or magnetoresistive (MR) sensors to be used because temperatures that are tolerable for the sensor element prevail outside the turbocharger. The pole piece used concentrates the magnetic field with respect to the sensor element, so that a sufficiently high field strength that can be measured well penetrates the sensor element even when there is a relatively great distance between the magnet rotating on the turboshaft and the sensor element. The pole piece can be integrated in the compressor housing, with only minor disturbance of the air stream in the air inlet of the compressor for example. The signal generated by the sensor element according to the present invention allows the boost-pressure control valve to be controlled very quickly and precisely, or the turbine geometry of VTG superchargers can be changed very quickly and precisely, to avoid exceeding the permissible rotational speed of the running gear. As a consequence, the turbocharger can always be operated very close to its speed limit, whereby it achieves its maximum efficiency. Furthermore, the relatively great safety margin from the maximum speed limit which is required by conventional pressure-controlled turbochargers is not required.

According to one embodiment, the sensor element is a Hall sensor element. Hall sensor elements are very well suited for sensing the variation of a magnetic field and can therefore be used very well for the speed sensing. Hall sensor elements can be commercially obtained at very low cost and can also be used at temperatures up to approximately 160° C.

As an alternative to this, the sensor element may be formed as a magnetoresistive (MR) sensor element. MR sensor elements are for their part well suited for sensing the variation of a magnetic field and can be commercially obtained at low cost.

In a further alternative embodiment, the sensor element is formed as an inductive sensor element. Inductive sensor elements are also ideally suited for sensing the variation of a magnetic field.

The pole piece may arranged in the axial extension of the turboshaft. In the case of this arrangement of the pole piece, the air stream in the air inlet of the compressor is only hindered by the sensor itself to a very small degree. The efficiency of the turbocharger is fully retained as a result.

The pole piece may be molded on the sensor housing. In the injection-molding process, the pole piece can be connected to the sensor housing very simply and at low cost.

According to a specific embodiment, the pole piece is formed as a pin. The long and narrow pin form makes it possible for the magnetic field to be concentrated and guided over a long distance, the air flow in the compressor only being influenced to very small degree. The pole piece exhibits very advantageous behavior in the air stream if it is formed in an aerodynamic manner.

The magnetic field is advantageously guided and concentrated toward the sensor element by the pole piece if the pole piece consists of soft iron, transformer plate, machining steel or unalloyed steel with silicon and/or carbon additions.

If the pole piece is formed in an angled manner, the magnetic field can also be guided and concentrated toward the sensor element over a path that is not straight, which is very advantageous in the case of some structural forms of the compressor housing.

In some alternative embodiments, a pole piece is arranged in front of and/or behind the sensor element with respect to the turboshaft. In all cases, the pole piece or the pole pieces can guide and concentrate the magnetic field toward the sensor element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
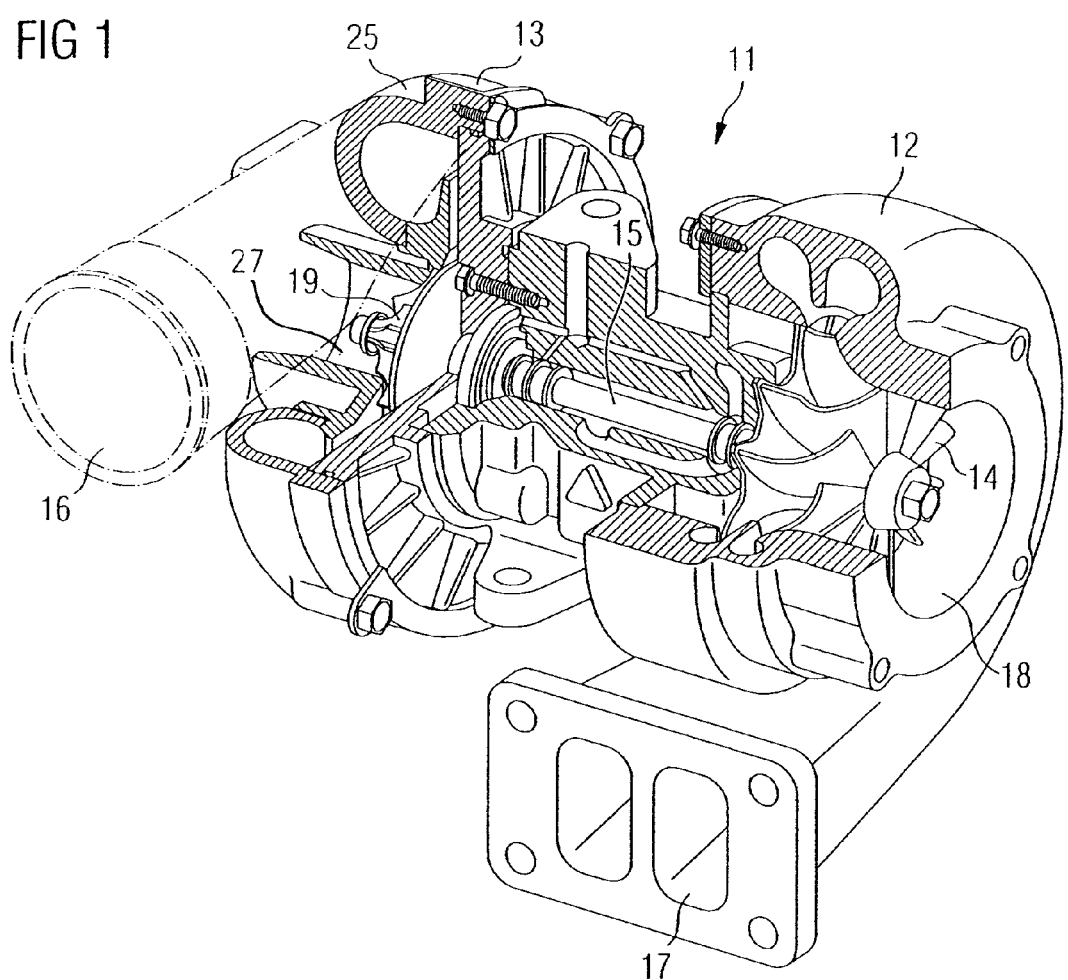
FIG. 1 is a perspective partial cutaway view of a conventional exhaust gas turbocharger.

FIG. 1 shows a conventional exhaust gas turbocharger 11 with a turbine 12 and a compressor 13. A compressor wheel 19 is rotatably mounted in the compressor 13 and is connected to one end of a turboshaft 15. Another end of the rotatably mounted turboshaft 15 is connected to a turbine wheel 14. Hot exhaust gas from an internal combustion engine (not represented here) is admitted into the turbine 12 via a turbine inlet 17 which sets the turbine wheel 14 in rotation. The exhaust gas stream leaves the turbine 12 through a turbine outlet 18. The turbine wheel 14 is connected to the compressor wheel 19 by the turboshaft 15. Consequently, the turbine 12 drives the compressor 13. Air is sucked into the compressor 3 through an air inlet 27, and is then compressed in the compressor 13 and supplied to the internal combustion engine via the air outlet 16.

Figure 2:
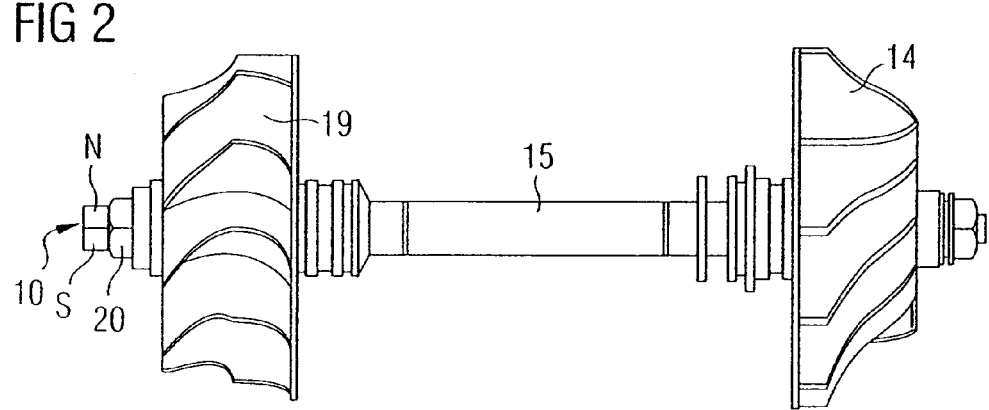
FIG. 2 is a side view of a turboshaft and the compressor wheel of the turbocharger of FIG. 1.

FIG. 2 shows the turboshaft 15 and the compressor wheel 19. The compressor wheel 19 is produced for example from an aluminum alloy in a precision casting process. The compressor wheel 19 is fastened to an end 10 of the turboshaft 15 on the compressor side, generally by a fastening element 20 such as, for example, a cap nut, which, with a sealing bush, a bearing collar and a spacing bush, firmly clamps the compressor wheel 19 against the turboshaft collar. For this purpose, a thread is formed on the end 10 of the turboshaft 15 on the compressor side. Since the compressor wheel 19 generally consists of an aluminum alloy, no magnetic field variation can be measured at the compressor wheel 19 itself.

A great advantage of measuring the rotational speed of the turboshaft 15 with a sensor element 3 which can be positioned outside the turbocharger 11 on the compressor housing 25 is the temperature that prevails here. The exhaust gas turbocharger 11 is exposed to high thermal loading, in which temperatures up to 1000° C. occur. With known sensor elements 3, such as Hall sensors or MR sensors for example, measurement cannot be carried out at these temperatures. Outside the turbocharger, such as on or in the compressor housing 25, there is a much lower thermal load. In the air inlet 27 of the compressor 13, temperatures of approximately 140° C. generally occur in continuous operation and 160 to 170° C. after peak loading. A pole piece 6 can be placed here without any problem, without the material that is used being thermally damaged. The pole piece 6 may be formed in a very slender manner, whereby the air stream 9 (see FIG. 4) in the air inlet 27 is scarcely disturbed. With the pole piece 6, a magnetic field 26 (see, e.g., FIG. 5) emanating from the end 10 of the turboshaft 15 is concentrated toward the sensor element 3 (see FIG. 5), whereby the field strength prevailing in the sensor element 3 can be at least doubled in comparison with the formation of the sensor 1 without the pole piece 6.

Figure 3:
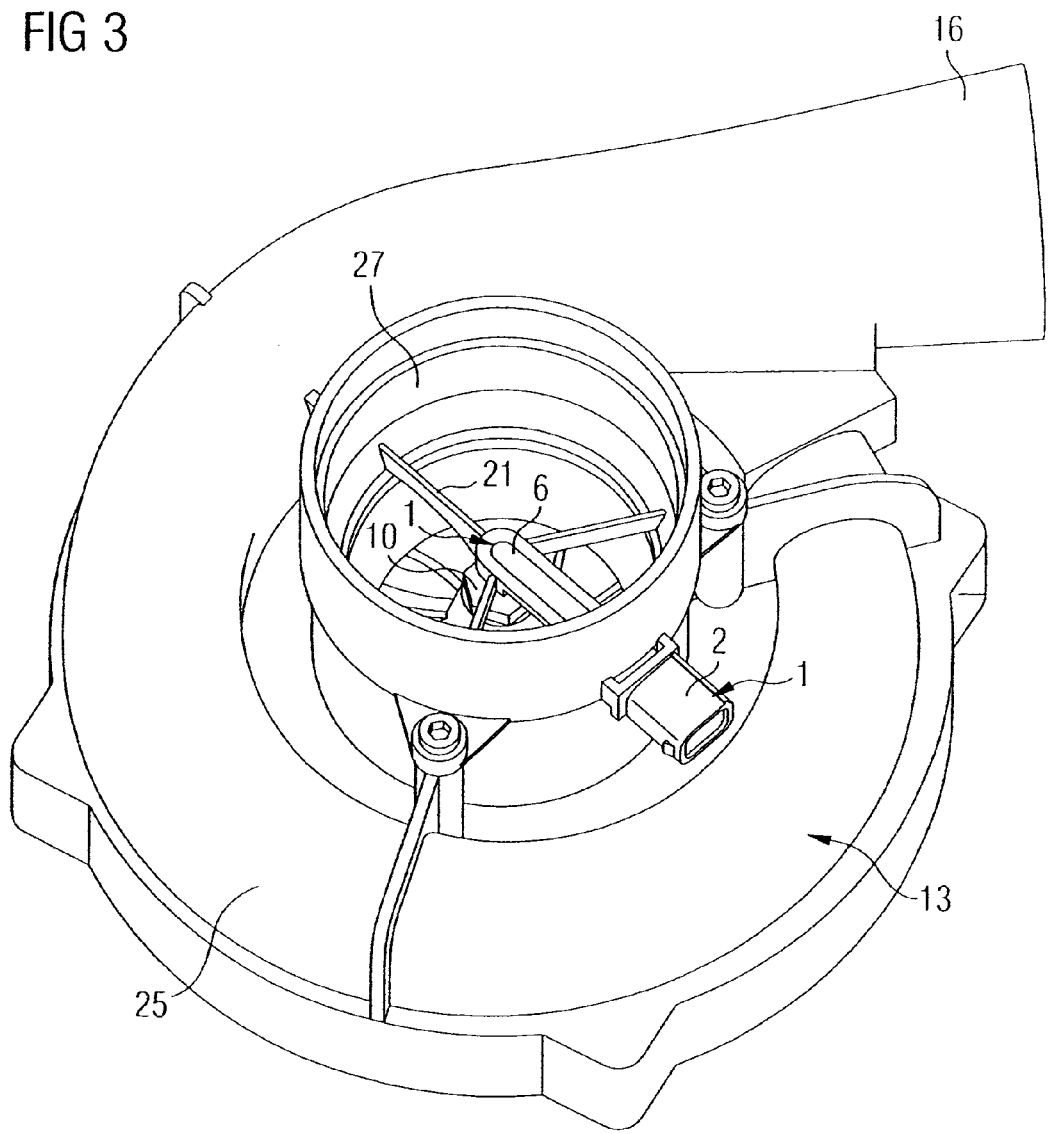
FIG. 3 is a perspective end view showing the compressor of the exhaust gas turbocharger of FIG. 1.

FIG. 3 shows the compressor 13 of the exhaust gas turbocharger 11. The compressor 13 has a compressor housing 25 defining the air outlet 16 and the air inlet 27. In the air inlet 27, the end 10 of the turboshaft 15 on the compressor side can be seen. The end 10 of the turboshaft 15 on the compressor side varies a magnetic field, which is sensed by the sensor 1. The sensor 1 is arranged in the compressor housing 25 such that the pole piece 6 extends up to the end 10 of the turboshaft 15 on the compressor side and the sensor element 3 (not represented here) is arranged largely outside the compressor housing 25, as a result of which it is subjected to only harmless thermal loads by the heated-up exhaust gas turbocharger 11. The sensor element 3 (not visible) is arranged in the sensor housing 2 and is consequently also protected from external influences. The pole piece 6 concentrates the field lines (not represented here) toward the sensor element 3, whereby the latter is supplied with an adequately high magnetic field strength to sense the rotation of the turboshaft 15.

Figure 4:
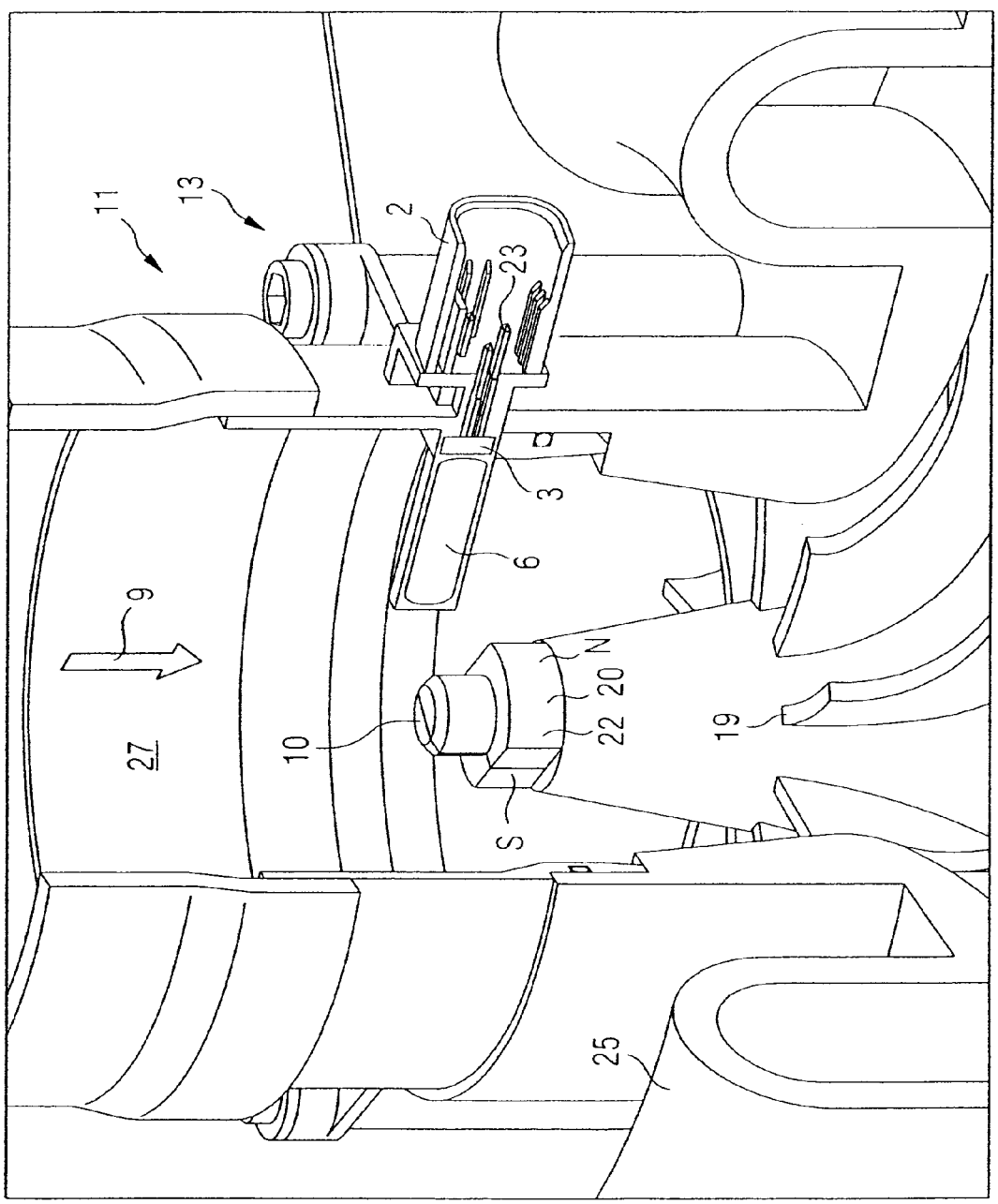
FIG. 4 is a partial cutaway view of the compressor of FIG. 3.

An enlarged and cut-open representation of the compressor 13 from FIG. 3 is represented in FIG. 4. Once again, the end 10 of the turboshaft 15 on the compressor side can be seen. The compressor wheel 19 is arranged on the turboshaft and fastened by a fastening element 20, which may be formed as a nut. At the same time, the fastening element 20 serves here as an element for varying the magnetic field. Here, the element for varying the magnetic field is a magnet 22 rotating with the turboshaft 15. The magnet 22 has a North pole N and a South pole S. The magnetic field may, however, also be generated at some other location, for example in the sensor 1 itself, and changed over time in a way corresponding to the rotation of the turboshaft 15 by the element for varying the magnetic field.

The sensor 1 is also shown in a sectional representation in FIG. 4. Here, the sensor element 3 is positioned outside the air stream in the compressor 13 in the compressor housing 25. The pole piece 6 is attached to the sensor element 3 to facilitate sensing by the sensor element 3 the variation of the magnetic field produced by the rotating magnet 22. The pole piece 6 may be formed in a very slender manner, so that it only minimally hinders the air stream in the compressor 13 or not at all. In addition, the pole piece 6 may be formed in an aerodynamic manner, which is shown in more detail in FIGS. 13 and 14. Furthermore, the connection pins 23, which serve for contacting the sensor element 3 with respect to downstream evaluation electronics, can be seen in the sensor housing 2. In addition, evaluation electronics, which amplify, transform or evaluate in measuring terms the signals of the sensor element 3, may be provided in the sensor housing 2. The air stream 9 through the air inlet 27 to the compressor wheel 19 is not hindered by the pole piece 6 formed in such a manner. As a result, the efficiency of the turbocharger 11 is fully retained. In this embodiment, the compressor housing 25 only has to be provided with a small aperture at one location, in the region of the air inlet 27 that is relatively uncritical in terms of flow to position the sensor 1 advantageously.

Figure 5:
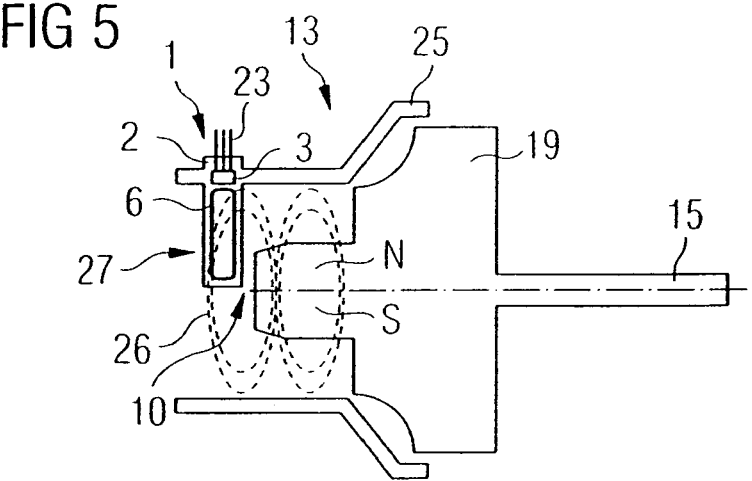
FIG. 5 is a schematic diagram showing an arrangement of the sensor in the compressor housing according to the present invention.

FIG. 5 schematically shows an arrangement of the sensor 1 in the compressor housing 25. An element for varying the magnetic field, which has a North pole N and a South pole S, is formed on the end 10 of the turbocharger 15 on the compressor side. The field lines 26 are brought together by the pole piece 6 and concentrated toward the sensor element 3. In this way, the sensor element 3 can be arranged at a relatively great distance from the element for varying the magnetic field. The pole piece 6 extends in front of the end 10 of the turboshaft 15 on the compressor side and is placed in the air inlet 27 of the compressor 13. The air stream is scarcely impaired by the pole piece 6, since the latter can be configured in a very narrow manner and can be inserted in the air flow in an aerodynamic manner.

Figure 6:
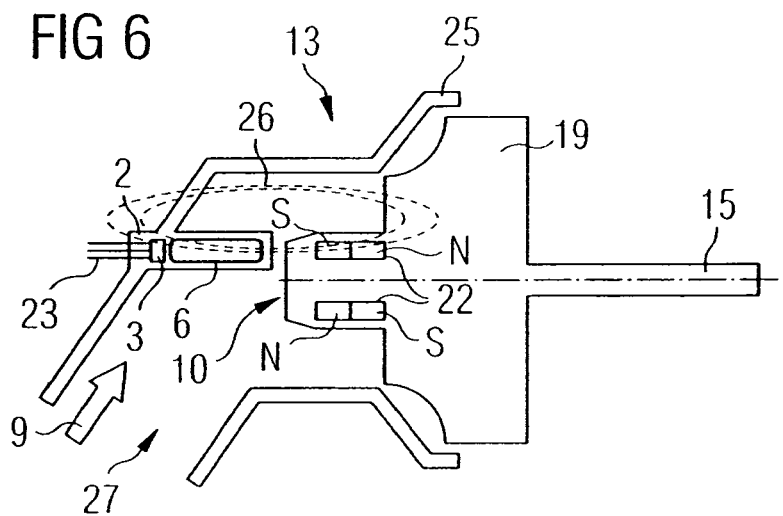
FIG. 6 is a schematic diagram showing a sensor arrangement in an angled air inlet according to the present invention.

In the case of an angled air inlet 27, as represented in FIG. 6, the sensor 1 may be arranged in extension of the turboshaft 15 in front of the end 10 on the compressor side. Here, two magnets 22, which in each case have a North pole N and a South pole S, are positioned in the end 10 of the turboshaft 15 on the compressor side. If the turbocharger 15 rotates, the magnetic field 26 in front of the pole piece 6 varies and the pole piece 6 concentrates the magnetic field 26 toward the sensor element 3. Here, too, it can be clearly seen that the air stream 9 is influenced very little by the sensor 1 and its pole piece 6.

Figure 7:
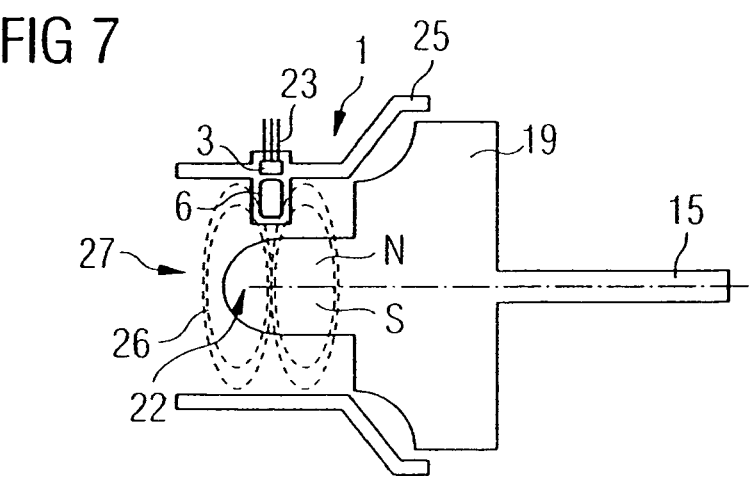
FIG. 7 is a schematic diagram showing another sensor arrangement in a compressor housing according to the present invention.

FIG. 7 shows a construction similar to that in FIG. 5, the sensor 1 with its pole piece 6 being attached here in such a way that the pole piece 6 senses the magnetic field 26 next to the end 10 of the turboshaft 15 on the compressor side.

Figure 8:
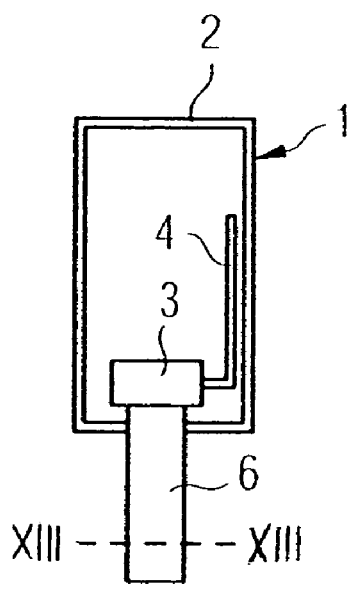
FIG. 8 is a schematic diagram showing a sensor with a sensor housing according to the invention.

Various configurations of the sensor 1 are represented in FIGS. 8 to 11. FIG. 8 shows a sensor 1 with a sensor housing 2, in which the sensor element 3 is arranged. The pole piece 6 is located on the sensor element 3 and extends toward the turboshaft 15 (not represented here). Electric leads 4, which connect the sensor element 3 to downstream electronics, can be seen in the sensor housing 2, emerging from the sensor element 3.

Figure 9:
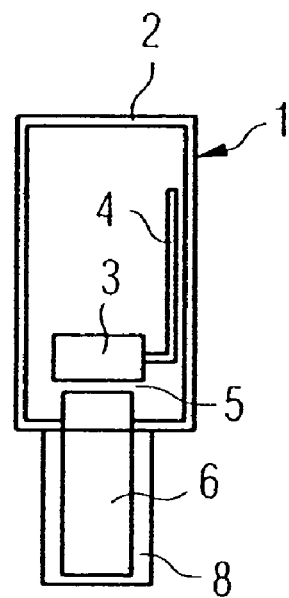
FIG. 9 is a schematic diagram of another arrangement of a sensor and sensor housing according to the invention.

FIG. 9 shows a similar arrangement to that in FIG. 8, with a distance being formed between the pole piece 6 and the sensor element 3. This distance may be filled for example with a thermoplastic material. The pole piece 6 is molded here on the sensor housing 2 and surrounded by a further encapsulation 8, in order to protect the pole piece 6 from contaminants and physical damage.

Figure 10:
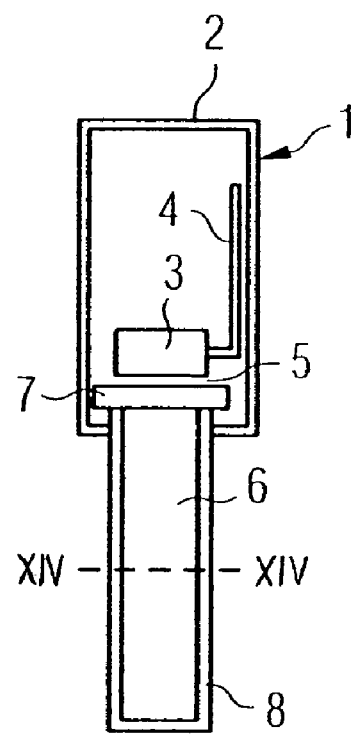
FIG. 10 is a schematic diagram of another arrangement of a sensor and sensor housing according to the invention in which the pole piece has an upper region.

In FIG. 10, an upper region 7 formed of the same material as the pole piece is arranged on the pole piece 6, wherein the upper region 7 and the pole piece 6 together form a T shape. As a result, it is easier to mold the pole piece 6 onto the sensor housing 2, because the upper region 7 inserts itself into the sensor housing 2 almost like an anchor. Here, too, an encapsulation 8 is provided for fixing and protecting the pole piece 6.

Figure 11:
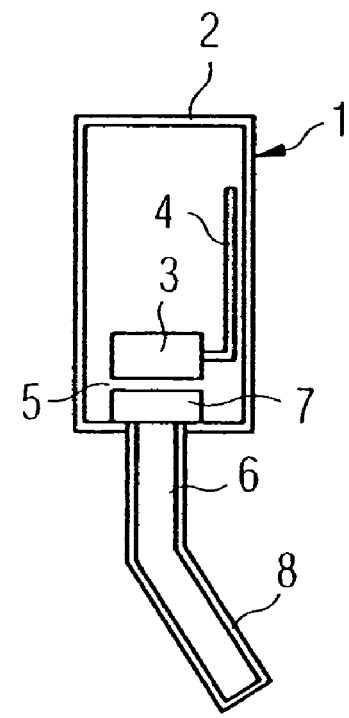
FIG. 11 is a schematic diagram of another arrangement of a sensor and sensor housing according to the invention with an angled pole piece.

FIG. 11 shows an angled pole piece 6. Depending on the design of the air inlet 27 of the compressor 13, it may be necessary with the aid of the pole piece to guide the field lines toward the sensor element 3 over a path which is not straight. For this purpose, the pole piece 6 can in principle be formed in any desired shape.

Figure 12:
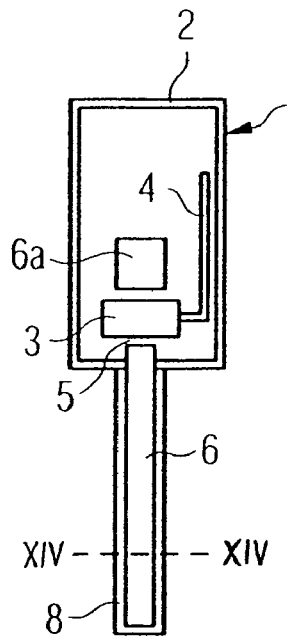
FIG. 12 is a schematic diagram of yet another arrangement of a sensor and sensor housing according to the invention.

In FIG. 12, a further embodiment of the sensor 1 is represented. Shown here is a pole piece 6 which is placed in front of the sensor element 3 and extends to the end 10 of the turboshaft 15 on the compressor side. In addition, the sensor 1 that is shown in FIG. 12 has a further pole piece 6a located behind the sensor element 3. The magnetic field 26 is also effectively brought together and concentrated toward the sensor element 3 by this further pole piece 6a. In this way, the sensor element 3 can be arranged relatively far away from the element for varying the magnetic field, the sensor element 3 still being supplied with adequately high magnetic field strengths.

Figure 13:
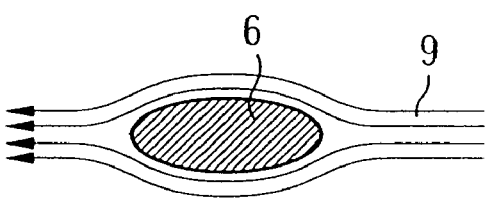
FIG. 13 is a sectional view through the pole piece along the line XIII-XIII in FIG. 8.

FIG. 13 shows a section through the pole piece 6 along the line XIII-XIII shown in FIG. 8. The pole piece that is shown in FIG. 13 is clearly elliptically shaped and it can be seen well how the air stream 9 closely follows the elliptical shape of the pole piece 6, with no vortexing in the air stream 9.

Figure 14:
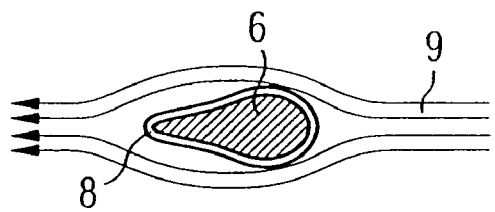
FIG. 14 is a sectional view through the pole piece along the line XIV-XIV in FIG. 10.

FIG. 14 shows a cross-sectionally drop-shaped formation of the pole piece 6, the pole piece also being provided here with an encapsulation 8. Here, the section along the line XIV-XIV from FIG. 10 is shown. Here, too, the air stream 9 closely follows the pole piece 6 in an aerodynamic manner. Vortexing in the air stream 9 is largely prevented by this drop-shaped pole piece 6.

Figure 15:
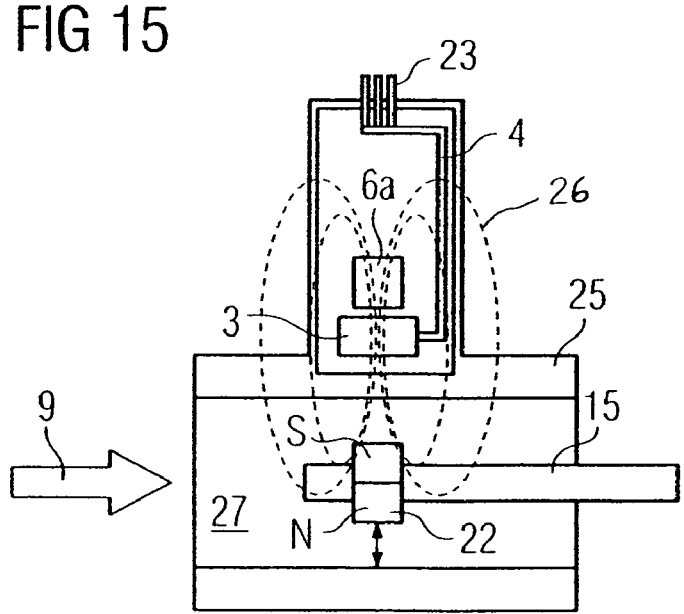
FIG. 15 is a schematic diagram of an arrangement in which the sensor is arranged on the compressor housing.

FIG. 15 shows an arrangement in which the sensor 1 is arranged on the compressor housing 25. An aperture of the compressor housing 25 is not necessary in the case of this embodiment of the sensor 1. The sensor 1 also exhibits a sensor element 3, which is arranged in the sensor housing 2, the pole piece 6a being arranged behind the sensor element 3 as seen from the end 10 of the turboshaft on the compressor side. The pole piece 6a arranged behind the sensor element 3 is also capable of concentrating the magnetic field 26 generated by the magnet 22 toward the sensor element 3. In the case of this refinement, the air stream 9 in the air inlet 27 does not experience any hindrance by the sensor 1. This is extremely advantageous, since the capacity of the turbocharger 11 is consequently not impaired in any way by the sensor 1.

Figure 16:
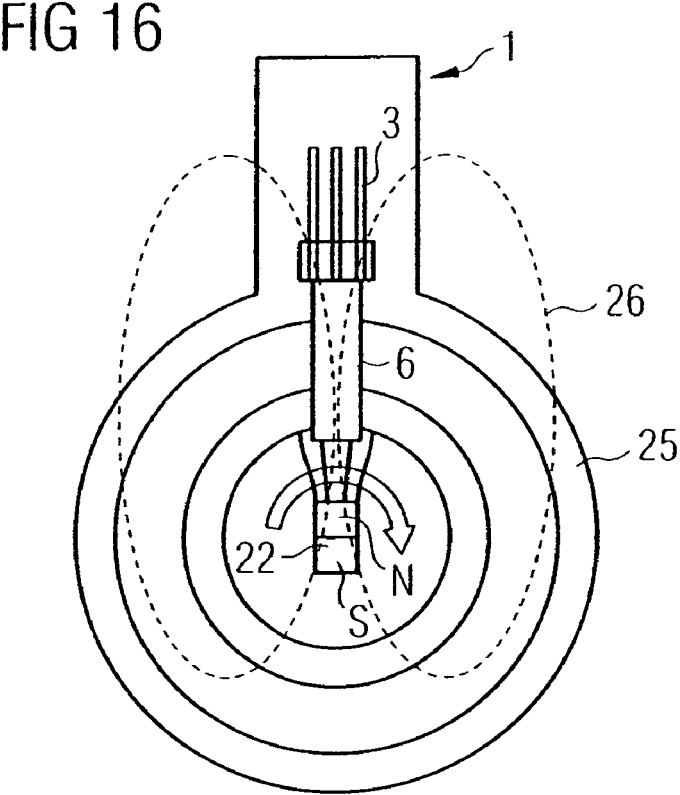
FIG. 16 is a schematic sectional front view of a double-walled turbocharger with a sensor arrangement according to the present invention.
Figure 17:
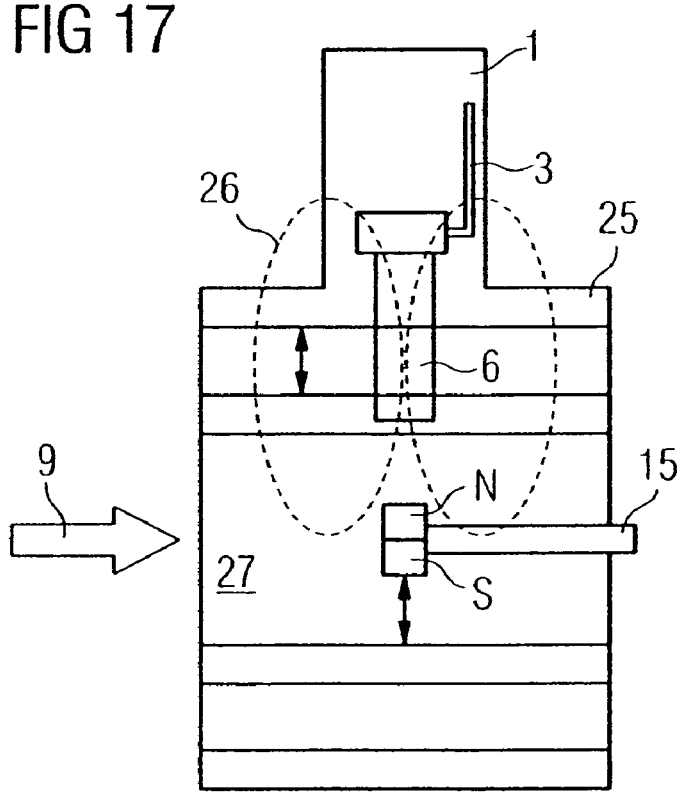
FIG. 17 is a sectional side view of the double-walled turbocharger of FIG. 16.

The sensor 1 according to the invention can also be advantageously used in the case of double-walled turbochargers, as are represented in FIGS. 16 and 17. Here, the pole piece 6 protrudes through the first wall of the compressor housing 25 into the second wall of the compressor housing 25, whereby the magnetic field 26 generated by the magnet 22 is concentrated toward the sensor element 3. In FIG. 17 there is a representation from the side of the construction in FIG. 16. Here, too, it is possible to see the double-walled compressor housing 25, on which the sensor 1 is mounted and through which the pole piece 6 protrudes toward the end 10 of the turboshaft 15 on the compressor side. The air stream 9 in the air inlet 27 of the inner region of the compressor housing 25 is not impaired by the pole piece 6 on the sensor 1. It can be seen how the pole piece 6 concentrates the magnetic field 26 toward the sensor element 3 over a great distance, so that adequately good measurement signals can be generated by the sensor element 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sensor for measuring the rotational speed of a turbo shaft of a turbocharger, the turbocharger having a compressor housing, said sensor comprising:
   a sensor housing;
   a permanent magnet coupled to the turboshaft;
   a sensor element positioned in said sensor housing for sensing a variation of a magnetic field of the permanent magnet caused by rotation of the turboshaft; and
   a pole piece arranged on said sensor element for concentrating the magnetic field in said sensor element, the pole piece being arranged and dimensioned such that said sensor element is positionable outside the air stream in the turbocharger on or in the compressor housing;
   wherein the sensor is disposed in the compressor housing such that the pole piece extends up to the end of the turboshaft on the compressor side, and the sensor element is disposed largely outside the compressor housing.

2. The sensor of claim 1, wherein said sensor element is a Hall sensor element.

3. The sensor of claim 1, wherein said sensor element is a magnetoresistive sensor element.

4. The sensor of claim 1, wherein said sensor element is an inductive sensor element.

5. The sensor of claim 1, wherein said pole piece is arranged for sensing a variation of a magnetic field caused by rotation of the turboshaft in the axial extension of the turboshaft.

6. The sensor of claim 1, wherein said pole piece is molded on said sensor housing.

7. The sensor of claim 1, wherein said pole piece is a pin.

8. The sensor of claim 1, wherein said pole piece is formed aerodynamically with respect to an air flow of the turbocharger.

9. The sensor of claim 1, wherein said pole piece is formed from soft iron.

10. The sensor of claim 1, the pole piece is formed from transformer plate.

11. The sensor of claim 1, wherein said pole piece is formed from machining steel.

12. The sensor of claim 1, wherein said pole piece is formed from unalloyed steel with one of silicon or carbon additions.

13. The sensor of claim 1, wherein said pole piece is angled.

14. The sensor of claim 1, wherein said pole piece is arranged in front of said sensor element with respect to the intended placement of the turboshaft.

15. The sensor of claim 14, further comprising an additional pole piece arranged behind said sensor element with respect to the intended placement of the turboshaft.

16. An exhaust gas turbocharger for an internal combustion engine, comprising:

a compressor housing and a turboshaft having an end arranged in said compressor housing; and a sensor comprising a sensor housing, a permanent magnet coupled to the turboshaft, a sensor element positioned in said sensor housing for sensing a variation of a magnetic field of the permanent magnet caused by rotation of said turboshaft, and a pole piece arranged on said sensor element for concentrating the magnetic field in said sensor element, said sensor element being positioned outside an air stream in said turbocharger on or in said compressor housing.

17. The turbocharger of claim 16, wherein said pole piece is arranged in an axial extension of said turboshaft.

* * * * *